(12) United States Patent  (10) Patent No.: US 8,321,338 B2
Baumgart et al.  (45) Date of Patent: Nov. 27, 2012

(54) ELECTRONIC NETWORK ACCESS DEVICE

(75) Inventors: Mark D Baumgart, Larkspur, CO (US);
Bruce A Dragt, Marietta, GA (US);
Gordon F Force, Jr., Half Moon Bay, CA (US)

(73) Assignee: First Data Corporation, Greenwood Village, CO (US)

( * ) Notice: Subject to any disclaimer, the term of this patent is extended or adjusted under 35 U.S.C. 154(b) by 454 days.

(21) Appl. No.: 12/409,340

(22) Filed: Mar. 23, 2009

(65) Prior Publication Data

US 2009/0240592 A1  Sep. 24, 2009

Related U.S. Application Data

(60) Provisional application No. 61/038,668, filed on Mar. 21, 2008.

(51) Int. Cl.
*G06Q 30/00* (2012.01)
*G06Q 20/00* (2012.01)
*G06Q 40/00* (2012.01)
*G06Q 90/00* (2006.01)
*G06F 17/00* (2006.01)
*G06F 5/00* (2006.01)

(52) U.S. Cl. ............ 705/39; 705/14.1; 705/16; 705/35; 705/41; 705/500; 705/72; 235/380; 235/375

(58) Field of Classification Search .................. None
See application file for complete search history.

(56) References Cited

U.S. PATENT DOCUMENTS

| | | | | |
|---|---|---|---|---|
| 6,000,832 A * | 12/1999 | Franklin et al. | ............... | 700/232 |
| 6,014,635 A * | 1/2000 | Harris et al. | ............... | 705/14.17 |
| 6,990,470 B2 * | 1/2006 | Hogan et al. | ............... | 705/64 |
| 7,059,517 B2 * | 6/2006 | Hopkins | .................... | 235/382.5 |
| 7,213,748 B2 * | 5/2007 | Tsuei et al. | ................... | 235/380 |
| 7,571,139 B1 * | 8/2009 | Giordano et al. | ............... | 705/40 |
| 7,797,251 B2 * | 9/2010 | Smith | ............................. | 705/72 |
| 2005/0234817 A1 | 10/2005 | VanFleet et al. | | |
| 2005/0234822 A1 * | 10/2005 | VanFleet et al. | ................ | 705/44 |
| 2007/0022046 A1 * | 1/2007 | Kingsborough et al. | ....... | 705/39 |
| 2009/0055323 A1 * | 2/2009 | Rebidue et al. | ................. | 705/66 |
| 2009/0106134 A1 | 4/2009 | Royyuru | | |

OTHER PUBLICATIONS

Michael Gilleland, "Anatomy of Credit Card Numbers", Dec. 29, 2006, Merriam Park Software, retrieved from http://replay.waybackmachine.org/20061229211523/http://www.merriampark.com/anatomycc.htm.*

LL Bean web archive, Aug. 27, 2008, available at http://web.archive.org/web/20080827232010/http://www.llbean.com/webapp/wcs/stores/servlet/ShowOAPLander?storeId=1&langId=-1&psnl=2.*

* cited by examiner

*Primary Examiner* — Asfand Sheikh
*Assistant Examiner* — Allen Chein
(74) *Attorney, Agent, or Firm* — Kilpatrick Townsend & Stockton LLP

(57) ABSTRACT

Methods and systems are described for processing transactions. The methods and systems enable a consumer to present a customer identifier, such as a merchant loyalty or membership card or other identifier as a payment device at a point of sale. In one implementation, a personal account number is generated by appending a proprietary routing code to a customer registration account number so that the personal account number is formatted for transmission as a payment device number over an electronic funds transfer network. In another implementation, the customer registration account number comprises the proprietary routing code. A preferred payment account identifier is accessed, based on the personal account number, from a database, and a transaction approval message is constructed comprising the preferred payment account identifier. The account from which payment is made may be a credit account, a demand deposit account, a stored value account, or another kind of account.

40 Claims, 10 Drawing Sheets

BigStore
Registered Customer Payment Service Enrollment

Please complete this form to enroll in the Registered Customer Payment Service.

401 — Name(s): John Q. Doe
Address: 123 Main St.
Denver, CO 80202
Email: jqdoe@thisemail.net
Telephone: (303) 555-5555

Please enter your customer registration account number: 98761234

Please tell us which account you would like payments to be made from when you present your BigStore membership card as payment for a purchase:

402 — [X] Credit
Card Number: 5789 1234 1234 1234
Expiration Date: 12/2012

403 — [ ] Demand deposit
Account Number:

Please choose a 4-digit PIN to use for making payments with your BigStore membership card. 5555

If you are enrolling using a debit account, please include both the bank routing number and the account number. You can locate this information on a check as shown below.

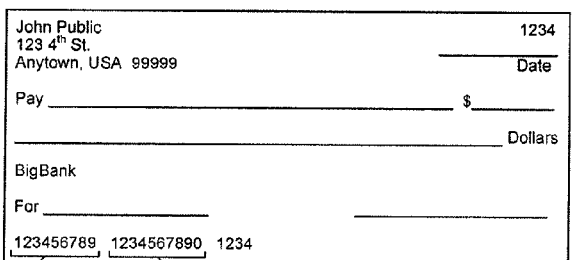

Routing Number    Account Number

BigStore Registered Customer Database

| Name | Address | Customer # | Pmt Type, Account # |
|---|---|---|---|
| JOHN Q DOE | 123 4TH ST DENVER CO 80202 | 98761234 | CREDIT 5789123412341234 |
| MARY SMITH | 567 8TH ST GREELEY CO 80631 | 89374826 | CREDIT 5432987698769876 |
| JAMES JONES | 234 5TH ST BOSTON MA 02108 | 73859275 | DEBIT 1234567892345678901 |
| SUSAN JOHNSON | 345 6TH AVE LOS ANGELES CA 90001 | 67388482 | CREDIT 4863782749283783 |
| . . . | . . . | . . . | . . . |

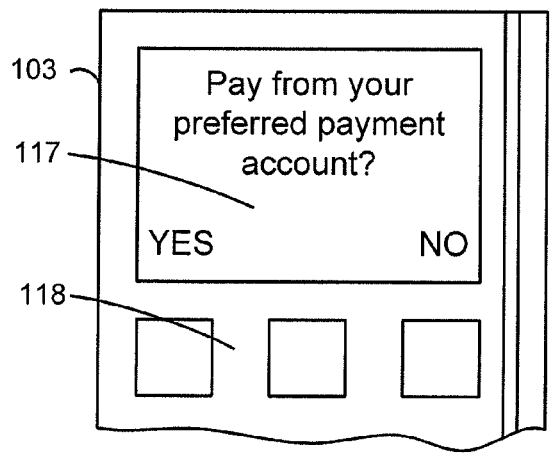
FIG. 6
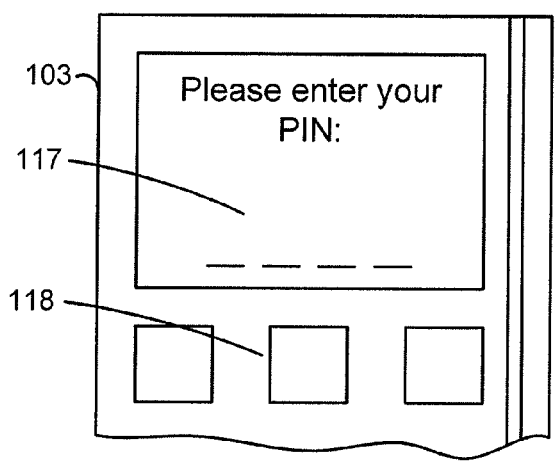
FIG. 7
800
1639635000098761234
PROPRIETARY ROUTING CODE | ZERO PADDING | CUSTOMER REGISTRATION ACCOUNT NUMBER
FIG. 8

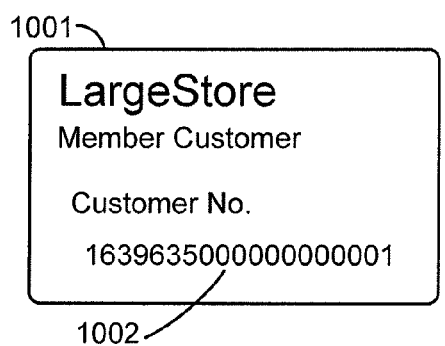 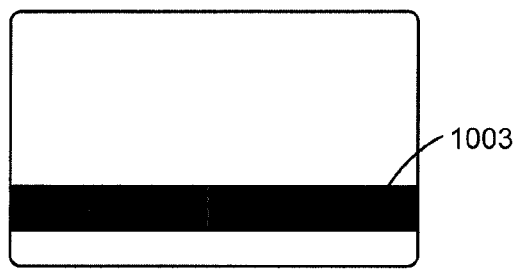
FIG. 10A
FIG. 10B

ELECTRONIC NETWORK ACCESS DEVICE

BACKGROUND OF THE INVENTION

Modern consumers often carry a large number of various cards and other items, including credit cards, debit cards, licenses, merchant loyalty or membership cards such as frequent flyer cards or preferred customer cards, insurance cards, and other items. The task of carrying and keeping track of these items is burdensome, and it is desirable to find a way to reduce the number of items that a consumer needs to carry. Furthermore, some of these kinds of items require use of an identifying number, often called a "personal identification number" or PIN. Remembering a large number of PINs is also burdensome, and it would be desirable to find a way to reduce the number of PINs that the consumer must remember.

BRIEF SUMMARY OF THE INVENTION

Methods and systems are presented that allow use of a customer identification device, such as a merchant loyalty or membership card or other device, to be used as a payment device.

In one embodiment of the invention, a method of processing an electronic payment comprises receiving, at a point of sale at the time of a purchase transaction, a customer identification device presented by a consumer as a payment device. A customer registration account number of a customer registration account associated with the customer identification device is identified. A personal identification number (PIN) is received from the consumer and it is verified that the PIN matches a reference PIN previously associated with the customer registration account. A generated personal account number (PAN) is generated by appending a proprietary routing code to the customer registration account number. The PAN is formatted for transmission as a payment device number over an electronic funds transfer network. Information about the transaction is forwarded to an acquirer of payment transactions. The transaction information includes at least the PAN and a transaction amount. Based on the PAN, a preferred payment account identifier, previously provided by the holder of the customer registration account, is accessed from a database stored on a computer readable medium. The preferred payment account identifier identifies a financial account from which payments are to be made when the customer identification device is used as the payment device. Payment of the transaction from the financial account is then initiated. The proprietary routing code is not in the format of a standard bank identification number. In some embodiments, the proprietary routing code comprises seven digits. In some embodiments, the proprietary routing code has a "1" as its first digit. In some embodiments, the generated PAN is 19 digits long.

In some embodiments, the method further comprises padding the generated PAN with zeros between the proprietary routing code and the customer registration account number. In some embodiments, the financial account is a credit card account, and initiating payment of the transaction comprises routing the transaction information to an issuer of the credit card account. In some embodiments, the financial account is a demand deposit account, and initiating payment of the transaction comprises creating and transmitting an automated clearing house file that instructs that the demand deposit account be debited the amount of the transaction. In some embodiments, the preferred payment account is a stored value account, and initiating payment of the transaction comprises routing the transaction information to an issuer of the stored value account. In some embodiments, the method further comprises enrolling the consumer in a customer registration program, and enrolling the consumer in the customer registration program further comprises receiving from the consumer identifying information about the consumer, receiving the reference PIN from the consumer, receiving the preferred payment account identifier from the consumer, providing the customer registration account identifier to the consumer, and associating the preferred payment account identifier with the customer registration account number in the database. In some embodiments, the customer identification device is a customer registration card, a biometric aspect of the consumer, or a telephone number. In some embodiments, the customer identification device is a card having the customer registration account number encoded on a magnetic strip. In some embodiments, the customer identification device provides the customer registration account number via a radio frequency signal. In some embodiments, the method further comprises receiving from a customer an indication that a second financial account is to be the preferred payment account, receiving from the customer a second preferred payment account identifier identifying the second preferred payment account, and recording the second preferred payment account identifier in the database.

In another embodiment of the invention, a method of processing an electronic payment comprises receiving, at a point of sale at the time of a purchase transaction, a customer identification device presented by a consumer as a payment device. A customer registration number of a customer registration account associated with the customer identification device is identified. The customer registration account number is formatted for transmission as a payment device number over an electronic funds transfer network. The customer registration account number comprises as its initial digits a proprietary routing code that is not in the format of a standard bank information number. A personal identification number (PIN) is received from the consumer, and it is verified that the PIN matches a reference PIN previously associated with the customer registration account identified by the customer registration account number. Based on the customer registration account number, a preferred payment account identifier, previously provided by the holder of the customer registration account, is accessed from a database stored on a computer readable medium. The preferred payment account identifier identifies a financial account from which payments are to be made when the customer identification devices is used as the payment device. Payment of the transaction from the financial account is initiated.

In some embodiments, the proprietary routing code comprises seven digits. In some embodiments, the proprietary routing code has a "1" as its first digit. In some embodiments, the customer registration account number is 19 digits long. In some embodiments, the financial account is a credit card account, and initiating payment of the transaction comprises routing the transaction information to an issuer of the credit card account for transaction approval. In some embodiments, the financial account is a demand deposit account, and initiating payment of the transaction comprises creating and transmitting an automated clearing house file that instructs that the demand deposit account be debited the transaction amount. In some embodiments, the financial account is a stored value account, and initiating payment of the transaction comprises routing the transaction information to an issuer of the stored value account for transaction approval. In some embodiments, the method further comprises enrolling the consumer in a customer registration program. Enrolling the consumer further comprises receiving from the consumer identifying information about the consumer, receiving from the consumer the preferred payment account identifier, providing to the consumer the customer registration account number, and associating the preferred payment account identifier with the customer registration account number. In some embodiments, the customer identification device is a card having the customer registration account number encoded on a magnetic strip. In some embodiments, the customer identification device provides the customer registration account number via a radio frequency signal In some embodiments, the method further comprises receiving from the consumer an indication that a second financial account is to be the preferred payment account, receiving from the consumer a second preferred payment account identifier identifying the second financial account, and recording in the database the second preferred payment account identifier.

In another embodiment, a customer identification device comprises a customer registration account number. The customer registration account number is formatted for transmission as a payment device number over an electronic funds transfer network. In some embodiments, the customer identification device is a card comprising a magnetic strip, and the customer registration account number is encoded on the magnetic strip. In some embodiments, the customer identification device stores the customer registration account number electronically, and is configured to provide the customer registration account number to a reader via a radio frequency signal.

In another embodiment, a point of sale system comprises a computer executing a program stored on a computer readable medium. The point of sale system is configured to receive a customer identification device presented by a consumer as a payment device at a point of sale at the time of a purchase transaction. The system identifies a customer registration account number of a customer registration account associated with the customer identification device, and forms a generated personal account number (PAN) by appending a proprietary routing code to the customer registration account number. The PAN is formatted for transmission as a payment device number over an electronic funds transfer network. The system forwards information about the transaction, including the generated PAN and a transaction amount, to an acquirer of payment transactions.

In another embodiment, a method of processing a transaction comprises receiving, from a merchant, transaction information comprising a personal account number. The personal account number is formatted for transmission as a payment device number over an electronic funds transfer network. It is recognized that the personal account number comprises a proprietary routing code that is not a standard bank identification number. Based on the personal account number, a preferred payment account identifier is accessed from a database. The preferred payment identifier identifies a financial account from which payments are to be made. Payment of the transaction from the financial account is initiated. In some embodiments, the personal account number is a generated personal account number formed by appending the proprietary routing code to a customer registration account number.

In another embodiment, a method of processing a transaction includes receiving, at a point of sale system executing a program stored on a computer readable medium, a customer identification device presented by a consumer as a payment device, and identifying a customer registration account number of a customer registration account associated with the customer identification device. A generated personal account number (PAN) is formed by appending a proprietary routing code to the customer registration account number. The PAN is formatted for transmission as a payment device number over an electronic funds transfer network. Information about the transaction, including the generated PAN and a transaction amount, is forwarded to an acquirer of payment transactions. In some embodiments, the proprietary routing code comprises seven digits. In some embodiments, the proprietary routing code comprises the numeral "1" as its first digit. In some embodiments, the generated PAN is 19 digits long. In some embodiments, the method further includes padding the generated PAN with zeros between the proprietary routing code and the customer registration account number.

In another embodiment, a system for processing transactions includes a host computer executing a program stored on a computer-readable medium, and an interface for receiving transaction information over a network. Under control of the stored program, the host computer receives, from a merchant via the network, transaction information comprising a personal account number. The personal account number is formatted for transmission as a payment device number over an electronic funds transfer network. The host computer recognizes that the personal account number comprises a proprietary routing code that is not a standard bank identification number and accesses, based on the personal account number, from a database stored on a computer readable medium, a preferred payment account identifier. The preferred payment account identifier identifies a financial account from which payments are to be made. The host computer also initiates payment of the transaction from the financial account. In some embodiments, the personal account number is a generated personal account number formed by appending the proprietary routing code to a customer registration account number. In some embodiments, the host computer further receives a personal identification number (PIN) transmitted by the merchant, and verifies that the PIN matches a reference PIN previously associated with the personal account number. In some embodiments, the host computer further receives, from an issuer of the financial account, an indication of whether the transaction is approved, and forwards the indication to the merchant.

BRIEF DESCRIPTION OF THE DRAWINGS

FIG. 4 shows an example user interface window that a customer may use for enrolling in a system that allows payment using a customer identification device, and for designating an account to be used for payments.

FIG. 5 shows an example partial database.

FIG. 6 shows an example query screen presented on a point of sale reader device.

FIG. 7 shows a PIN entry screen on a point of sale reader device, in accordance with an example embodiment of the invention.

FIG. 8 shows a generated personal account number in accordance with an example embodiment of the invention.

FIGS. 10A and 10B show front and back views respectively of a customer identification device in accordance with this example embodiment of the invention.

DETAILED DESCRIPTION OF THE INVENTION

Figure 1:
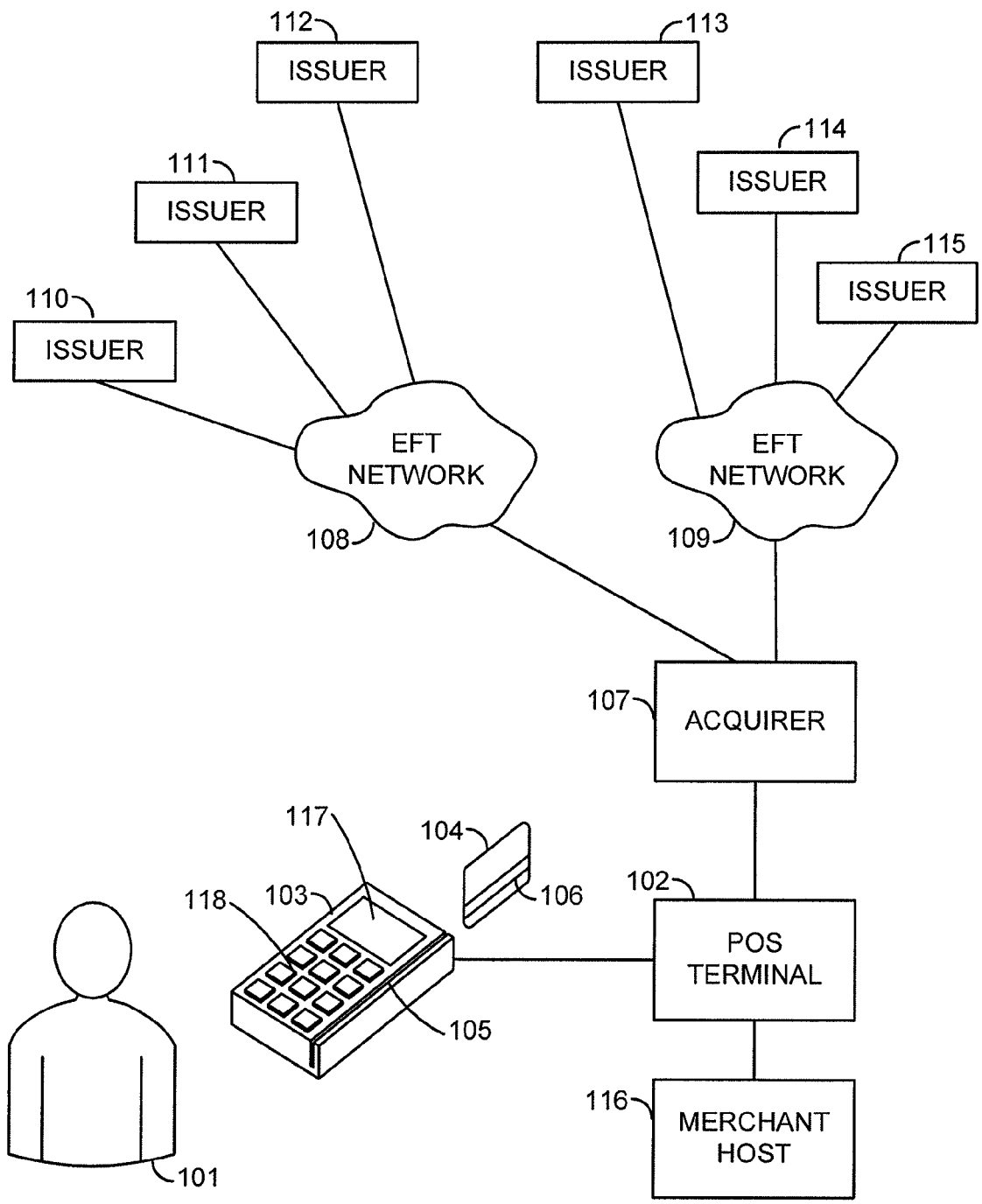
FIG. 1 shows a schematic conceptual diagram of part of a typical purchase transaction, in accordance with an example embodiment of the invention.

Many merchants register at least some of their customers. For example, a customer may enroll in a merchant's "preferred customer" or other loyalty program, and earn discounts, reward points, or other benefits based on the customer's purchase history with the merchant. In exchange, the merchant may track the buying habits of its customers, collectively or individually, for marketing purposes. Some merchants, especially warehouse stores, require that every customer join as a "member" before shopping at the merchant. Typically, in these kinds of programs, the merchant records some identifying information about each customer, and assigns each customer an account number or other identifier.

For the purposes of this disclosure, any of these kinds of arrangements will be referred to as a "customer registration program". Each registered customer is said to have a "customer registration account" with an associated account identifier be referred to as a "customer registration account number". A customer registration program is any kind of arrangement wherein a merchant identifies and registers individual consumers, and is intended to include memberships, loyalty programs, frequent purchaser programs, reward programs, preferred customer programs, and any other kind of customer registration arrangement. The term customer registration account number is intended to encompass any kind of identifier unique to a particular customer, including numbers and other strings of characters including digits, alphabetic characters, symbols, or any combination of these.

Typically, a merchant issues a card, token, or other kind of identification device to each registered customer at the time of registration or soon thereafter. Often, the identification device takes the form of a plastic card with the customer's customer registration number encoded on a magnetic strip on the card, similar to a credit or debit card. Other kinds of identification devices are possible, for example a token, key fob, or other item that stores data electronically and provides information via a radio frequency signal. When a registered customer makes a purchase at the registering merchant, the customer typically must present two items at the time of purchase. The customer must present some form of payment, such as a credit card, debit card, or other kind of payment device, and also must present the customer identifier so that the purchase can be recorded in the customer's loyalty, membership, or other registration account.

Some merchants do not require that the customer identifier be actually present, as long as the customer can provide some other way to identify his or her customer registration account. For example, the customer may be allowed to key in his or her customer registration account number to a keypad at the point of sale. Or, the customer may be allowed to provide some other identifying number that has been recorded as being associated with the account, for example the customer's telephone number. For the purposes of this disclosure, the item, number, or other identifier that a consumer presents as identification at the time of purchase will be referred to as a "customer identification device". This term is intended to encompass a card, token, fob, number, or other identifier unique to the particular consumer or customer registration account. A customer identification device may also be a biometric aspect of the particular customer, including a fingerprint, retinal pattern, voice signature, facial characteristic, or other aspect unique to the particular consumer and used to access the consumer's customer registration account.

For the purposes of this disclosure, a "payment device" is a card, token, fob, number, string, or other item presented by a consumer for payment for a purchase. For example, a payment device may be a credit card used to access a line of credit, a debit card used to access a debit account, the number of a stored value card such as a gift card, or may simply be the account number of a financial account from which payment is to be made. For the purposes of this disclosure, a "financial account" includes a credit card account or other line of credit, a debit account, a stored value account, a checking or demand deposit account, or any other kind account from which payment may be made.

For some kinds of payment devices, the consumer presenting the payment device may be required to provide additional authentication that he or she is the rightful holder of the account that the device accesses. For example, in the case of a debit card, the consumer may select or be assigned a "personal identification number" or PIN at the time the account is opened. Each time the card is used to make a purchase, the consumer may be asked to enter the PIN on a keypad at the point of sale as a way of verifying that he or she is the rightful account holder. For the purposes of this disclosure, a personal identification number or PIN is a number or string of alphanumeric characters used to verify the identity of a person presenting a payment device or customer identification device.

FIG. 1 shows a schematic conceptual diagram of part of a typical purchase transaction. In this example, a consumer 101 has made a selection of items and arrived at a checkout counter equipped with a point of sale (POS) system. The POS system includes a POS terminal 102 and a POS reader device 103. POS terminal 102 preferably comprises a computer executing a program stored on a computer readable medium, and may perform many functions, including acting as a cash register, cooperating with a scanning system to recognize items being purchased, and other functions. Once a total price has been determined for the consumer's purchases, consumer 101 presents a payment device 104, which in this example may be a credit card. Consumer 101 or a store clerk "swipes" the card 104 through slot 105 on POS reader device 103, and POS reader 103 automatically reads account information, such as an account number, from magnetic strip 106 on the back of card 104. As part of the transaction, consumer 101 may provide a signature as evidence that consumer 101 is the holder of the account associated with card 104.

Methods of processing transactions made with a "private label" card account are described in U.S. patent application Ser. No. 10/825,950 of VanFleet et al., titled "Methods and Systems for Universal Transaction Processing" and U.S. patent application Ser. No. 10/825,960 of VanFleet et al., titled "Methods and Systems for Private Label Transaction Processing", the entire disclosures of which are hereby incorporated by reference herein.

In this example, POS terminal 102 compiles a set of transaction information that includes such items as the total amount of the purchase, the date and time of the transaction, a merchant identifier, and the account information from card 104. POS terminal 102 sends the compiled transaction information to in a standardized format to acquirer 107. For the purposes of this disclosure, an acquirer is an entity that receives purchase transaction information from a merchant and, based on account number information, routes the transaction information over an electronic funds transfer network to an issuer of the account being used for payment.

In the example system of FIG. 1, POS reader 103 can read different kinds of cards, issued by many different entities. Example card 104 is a credit card, but reader 103 may also read debit cards, stored value cards, and other kinds of cards. Reader 103 may also be able to read information via a radio frequency signal, for example using a radio frequency identification (RFID) system. Each credit or debit card is issued by a financial institution, usually a bank. In the case of a credit card, the issuing bank extends credit to the holder of the card. As purchases are made with the card, the amount owed increases. Typically, a statement of charges is mailed to the cardholder monthly, and the cardholder pays the issuing bank to reduce the amount owed. Interest is typically charged on any unpaid balance. In the case of a debit card, the issuing bank maintains a debit account held by the cardholder, for example a checking or savings account. As purchases are made, finds are removed from the debit account to pay for them. In either case, at the time of purchase, the merchant contacts the card issuer (or a processor acting on behalf of the issuer) to verify that there is enough credit available on a credit line or there are enough funds available in a debit account to pay for the purchase.

There are many thousands of institutions that issue cards, and many thousands or millions of merchants that accept cards as payment. If each merchant were required to contact card issuers directly for transaction approval, enormous resources would be consumed by the task of maintaining relationships between merchants and issuers, and in configuring equipment to communicate between merchants and issuers. In order to simplify this process, many merchants use an acquirer such as acquirer 107 to route transaction information to issuers, and each issuer typically agrees to receive transaction approval requests over one electronic funds transfer (EFT) network, such as EFT networks 108 and 109 shown in FIG. 1. There are roughly dozens of EFT networks in operation, including Visa®, MasterCard®, and others used mainly in credit card transactions, and NYCE®, Star®, and others used mainly in debit transactions. Acquirers such as acquirer 107 define an information format for merchants to use in sending transaction information to the acquirers, and makers of equipment such as POS terminal 102 can configure their equipment to conform to these formats. Similarly, each EFT network prescribes a data format for receiving transaction information from a acquirers, and also for exchanging information with issuers such as issuers 110-115 shown in FIG. 1.

With this configuration, each merchant need only establish a relationship with a single acquirer, and the merchant can accept a wide variety of cards for payments. The acquirer maintains a database that indicates, based on the account number read from each card, to which issuer the transaction information should be routed and over which EFT network. This database is called a bank information number table, or "BIN table".

Figure 2A:
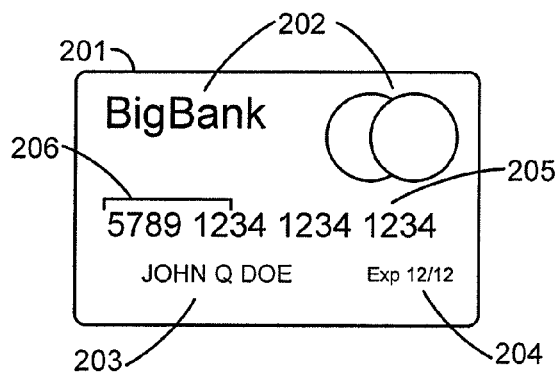
FIGS. 2A and 2B show respectively front and back views of an example credit card.
Figure 2B:
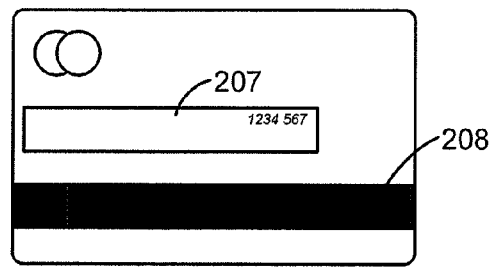

FIGS. 2A and 2B show respectively front and back views of an example credit card 201. The front of card 201, shown in FIG. 2A, carries a logo or other identifier 202 of the issuing financial institution, the account holder's name 203, an indication of the card expiration date 204, and an account number 205. The account number, which is typically embossed into the card, may contain up to 19 digits. The first six digits 206 are called a bank identification number (BIN), and indicate which financial institution issued the card, while the remaining digits include a customer account number and a check digit designed to aid in detecting data entry errors. Every card has a unique number, while multiple cards from a single issuer share the same BIN in the first six digits. Bank information numbers (BINs) conform to International Organization for Standardization (ISO) standard 7812, and are registered and allocated by the American Bankers Association.

The back of the card, shown in FIG. 2B, typically includes a signature block 207 where the cardholder signs as a security measure, and also includes a magnetic strip 208. The magnetic strip stores the account number 205 and other information so that the account number 205 can be easily and reliably read by automated equipment such as POS reader device 103.

While the system of FIGS. 1 and 2 describes conceptually how purchase transactions are handled, the figures are greatly simplified, and many variations are possible. For example, some merchants perform the function of the acquirer 107, routing transaction information without the aid of a separate acquirer. Some issuers use a processor entity to handle transaction approvals. Some entities may perform the functions of both acquirer 107 and a processor. The links shown between entities in FIG. 1 are symbolic, and may represent various agreements, computer networks, telecommunications networks, computer systems, and other infrastructure.

Figure 3A:
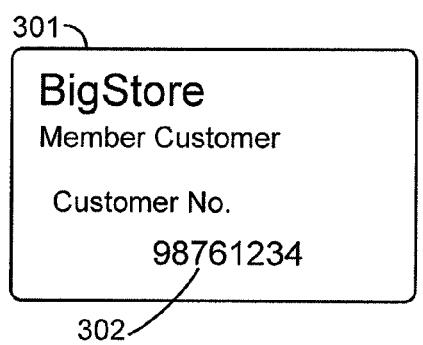
FIGS. 3A and 3B show respectively front and back views of an example customer registration card.
Figure 3B:
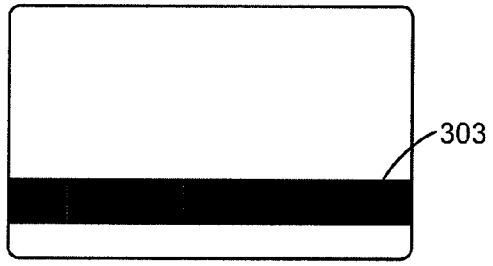

FIGS. 3A and 3B show respectively front and back views of an example customer registration card 301 that may be issued to a consumer by a merchant when the consumer enrolls in the merchant's membership, loyalty, or other program. Card 301 is an example of a customer identification device. Upon enrollment, the consumer has a customer registration account, designated by a customer registration account number. Card 301 has some features in common with credit card 201, but there are important differences as well. Customer registration card 301 is about the same size as credit card 201, and has a customer registration account number printed on its front side. The customer registration account number 302 is also encoded on a magnetic strip 303 on the back side of card 301, so that it can be conveniently and reliably read from magnetic strip 303 by a reader such as POS reader device 103. Customer registration account number 302 is usually not in the format of a standard account number as would be found on a credit or debit card. A card such as card 301 may include an RFID module so that the customer registration account number can be provided via a radio frequency signal to reader 103. Card 301 may include both a magnetic stripe and RFID capability, so that a "contactless" payment can be made via a radio frequency signal if reader 103 is so equipped, or card 103 can be swiped in the normal fashion if reader 103 does not have a contactless capability.

In accordance with a first example embodiment of the invention, various parts of a system as shown in FIG. 1 are configured to enable a registered customer to present his or her customer identification device as a payment device during a purchase transaction. Payment is made from an account previously designated by the registered customer, and such a system can be configured with minimal effort required on the part of the merchant. Because the customer identification device serves as both an indicator of the associated customer registration account and as a payment device, the customer need only carry one item for paying for purchases at the merchant and for obtaining the benefits of being a registered customer. In some embodiments, the customer can designate a credit account, a demand deposit account, or a stored value account, and may change the designated account easily.

FIG. 4 shows an example user interface window that a customer may use for enrolling in a system that allows payment using a customer identification device, and for designating an account to be used for payments. In the example of FIG. 4, the customer is enrolling by entering information into a web page served over the Internet by a host computer operated by or for the merchant. Many other enrollment methods are possible. For example, enrollment may be accomplished by telephone using a touch tone interface, an interactive voice response (IVR) interface, or by speaking with a customer service representative. Enrollment could be accomplished by mail, or in person at a store location of the merchant. Enrollment may be done as part of enrollment in a customer registration account with the merchant, or may be done by a customer who already has a customer registration account.

In the example enrollment window of FIG. 4, the enrolling customer provides some personal identifying information 401, and indicates 402 what kind of account will be used for payment when the customer's customer identification device is presented for payment, along with the account number of the account. For the purposes of this disclosure, this account will be referred to as a "preferred payment account", and the number of the preferred payment account is an example of a "preferred payment account identifier". The merchant may wish to authenticate the customer as the rightful holder of the account entered. Many authentication methods are possible, including the methods described in co-pending U.S. patent application Ser. No. 11/874,584 of Royyuru, filed Oct. 18, 2007 and titled "Service enrollee authentication", the entire contents or which are incorporated by reference herein for all purposes.

The enrolling customer also selects 403 a PIN for use when making payments using his or her customer identification device. For ease of explanation, the example of FIG. 4 shows a PIN simply being entered into a web page, but a merchant may wish to institute various security procedures for ensuring that no one other than the rightful account holder of the preferred payment account can easily obtain the PIN. For example, as part of the enrollment process, the merchant may assign a PIN to an account and mail the PIN to the address provided by the customer at registration time, and the customer may be able to confidentially change his or her PIN at any time.

Using information entered by a large number of registered customers, the registering merchant compiles a database of information from its registered customers. An example partial database 500 is shown in FIG. 5. Of course, such a database may contain other information as well, but database 500 contains at least a listing of customer registration account numbers and the corresponding preferred payment account identifiers of the preferred payment accounts designated by the registered customers. In accordance with an example embodiment of the invention, preferably at least a portion of database 500 resides at an acquirer such as acquirer 107 shown in FIG. 1. Preferably, the acquirer has at least the portion of database 500 including the customer registration account numbers and the corresponding preferred payment account identifiers, and also has enough information to recognize whether a correct PIN is supplied during a transaction. (The acquirer need not know the actual PIN, but may be able to detect using known encryption techniques that a correct PIN has been entered.)

Once the customer is enrolled, has identified a preferred payment account, and a reference PIN has been associated with the customer's registration account, the merchant enables use of the customer's customer identification device, such as card 301, for payments. Preferably, a POS terminal such as terminal 102 is programmed to enable at least some of the steps in the process. The terminal may cooperate with a merchant host computer system 116 operated by or for the merchant on which various information such as database 500 is stored.

Using card 301 as an example customer identification device and terminal 102 and reader 103 as example systems, when a registered customer presents card 301 for payment, it is "swiped" through or scanned by POS reader device 103, and the customer registration account number is derived from the card. For example, the customer registration number may be read directly from the card, or may be a number derived from or associated with a number read directly from the card. POS reader device 103 sends the customer registration account number to terminal 102, which, in cooperation with merchant host computer system 116, recognizes that the holder of card 103 has enrolled for the ability to present card 103 as a payment device. The system may ask the customer if he or she wishes to use the previously identified preferred payment account. This query may be presented, for example, on a screen 117 on POS reader 103, and the customer may answer using keys on keypad 118. An example query screen is shown in FIG. 6. When the customer indicates that he or she does want to pay from the preferred payment account, the system prompts the customer for the PIN associated with card 301. An example PIN prompt is shown in FIG. 7.

Once the PIN has been collected from the customer, terminal 102 compiles information about the transaction into a purchase message to be sent to acquirer 107. In order to use standard message formats and protocols, terminal 102 formats the message as if a standard credit or debit card number had been entered as a payment device instead of card 301 with its customer registration account number. In order to accomplish this, terminal 102 appends a proprietary routing code onto the beginning of the customer registration account number so that the resulting generated personal account number (PAN) resembles a standard credit or debit card number. However, the proprietary routing code is not a recognized bank identification number (BIN). In one example embodiment, the proprietary routing code has seven digits and begins with the digit "1", and the resulting PAN has 19 digits. Other starting digits may be used for the proprietary routing code, and other lengths may be used for the proprietary routing code and the generated PAN.

An example of a generated PAN 800 is shown in FIG. 8. PAN 800 has been generated by joining the proprietary routing code 1639635 with the customer registration account number 98761234 read from card 301. PAN 800 has been padded with zeros between those two portions so that the resulting PAN has 19 total digits. Other PAN lengths may be used, but 19 digits is preferable as it is the longest length expected by existing systems for handling credit card numbers, and therefore allows a method embodying the invention to be implemented with the largest number of existing customer registration programs. Different customer registration programs may use registration numbers of different lengths. If an existing registration numbering scheme can be used, a merchant may enable payment using existing customer identification devices (such as card 301) without having to revamp its customer registration program to assign new numbers. The same proprietary routing code may used in all personal account numbers processed according to embodiments of the invention, or different codes may be used for some personal account numbers than for others. For example, each merchant participating in a system embodying the invention have its own proprietary routing code.

The transaction information compiled by terminal 102 may include such items as:

MERCHANT: BIGSTORE
LOCATION: 16TH ST DENVER CO
DATE/TIME: 15 NOV 2007 17:52
AMOUNT: $63.59
PAYMENT ACCOUNT: 1639635000098761234
PIN INFO: #%*&
MERCHANT TYPE: 5731

This transaction information is sent from terminal 102 to acquirer 107 in the form of a standard transaction approval request.

A computer system at acquirer 107, executing a program stored on a computer readable medium, receives the transaction approval request message and recognizes that the account number supplied does not contain an ISO standard BIN in the first six digits. In the example above, the PAN begins with the digit "1", and no standard BINs currently in use begin with a "1". Acquirer 107 recognizes that the supplied number is a generated PAN associated with a merchant's customer registration program, and handles the approval request specially. Instead of searching a BIN table for an issuer identified by a BIN in the account number, the acquirer accesses the database of information from the merchant's customer registration program, looks up the preferred payment account number associated with the customer registration account number portion of the above message, and constructs a new approval request message that inserts the preferred payment account number in place of the generated PAN. The new approval request message may include information such as:

MERCHANT: BIGSTORE
LOCATION: 16TH ST DENVER CO
DATE/TIME: 15 NOV 2007 17:52
AMOUNT: $63.59
PAYMENT ACCOUNT: 5789123412341234
MERCHANT TYPE: 5731

Preferably, acquirer 107 has also verified that the customer entered the correct PIN. Because this particular example transaction uses a credit account for payment, no further PIN verification is performed.

Forwarding the new approval request message is an example of initiating payment of the transaction from the financial account. The approval request is forwarded to the issuer of the preferred payment account, the issuer replies with an approval message or a transaction denial message, and the approval message or denial message is relayed to the point of sale. These steps proceed as if the registered customer had presented credit card 201 as a payment device directly, rather than customer registration card 301 linked to credit card 201.

In the above example, the preferred payment account was a credit card account. Other kinds of accounts may be used. For example, a stored value account such as a gift account or prepaid card account may be identified by the registered customer as the preferred payment account.

In another example embodiment, a demand deposit account (DDA) is identified as the preferred payment account. An example of a demand deposit account is a personal checking account. Checking account transactions are generally processed through the Automated Clearing House (ACH), an electronic network for financial transactions operated in the United States by the Federal Reserve and Electronic Payments Network under rules promulgated by NACHA. NACHA was formerly known as the National Automated Clearing House Association.

In this example embodiment, initiating payment of the transaction may comprise, with the cooperation of a sponsoring bank acting as an Originating Depository Financial Institution (ODFI), creating an ACH file that instructs that the customer's demand deposit account be debited by the amount of the purchase and the funds transferred to an account held by the merchant. The file is sent through the ACH to the bank at which the customer's preferred payment account is held. The customer's bank is a Receiving Depository Financial Institution (RDFI), and authorizes the transfer of finds to the ODFI. ACH transactions are processed on a batch basis, and payments are typically settled within two business days.

Figure 9:
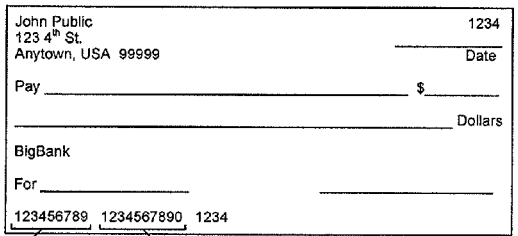
FIG. 9 shows an example user interface window for changing a preferred payment account, in accordance with an example embodiment of the invention.

In accordance with an other example embodiment of the invention, a registered customer can change which account is to be used as the preferred payment account. FIG. 9 shows an example user interface window 900 that a registered customer may use for this purpose. In this example, the registered customer is using a web page served over the Internet to change his preferred payment account, but a change may also be effected by telephone, by mail, in person at a merchant location, or by other means. In window 900, the customer has indicated 901 that a second financial account is to be used as the preferred payment account. While FIG. 9 shows the customer explicitly indicating that a change is desired, the indication may also be implied when a customer designates a preferred account number change interface, uses a telephone interface to request a change, mails a form indicating a second financial account as the preferred payment account, speaks to a customer service representative for the purpose of changing the preferred payment account, or from other actions performed by the customer and communicated to the merchant or the merchant's representative.

In the example screen of FIG. 9, the customer has indicated that the preferred payment account is to be a demand deposit account, and has provided the account number. The customer may then click the "Finalize Change" button, or otherwise verify that the change is to take place. The new account number is then associated with the customer's customer registration account number in a database such as database 500, and ensuing transactions are routed for payment from the new preferred payment account.

In the example above, the customer identification device was card 301, which was convenient because it could be read by POS reader device 103. Other kinds of customer identification devices may also be used. For example, a customer identification device may be a fob, token or other article carrying a unique account identifier. The identifier may be readable by a magnetic card reader, a bar code scanner, a contactless radio frequency (RF) reader, or may simply have a customer registration account number printed on it that can be keyed into a system, for example on keypad 118 or into terminal 102. A number or other identifier other than the customer's customer registration account number may be used. For example, if the customer has forgotten to bring his or her customer identification device to the merchant, the merchant may accept the telephone number or other piece of information as indicating a particular customer registration account. Such a system is still secure, because the customer is required to enter the correct PIN before the transaction can proceed. It is not possible for anyone to fraudulently access a customer's payment account by simply providing a telephone number in hopes that the telephone number is associated with a customer registration account at the merchant.

A biometric aspect of the customer may also be used as a customer identification device. For example, terminal 102 may be connected to a fingerprint scanner. A registered customer may provide a scan of his or her fingerprint at the time he or she enrolls in the system. In accordance with this embodiment of the invention, at the time of a transaction, the customer passes his or her finger over the fingerprint scanner, and the merchant's system recognizes that the customer's unique fingerprint pattern is on file and is associated with the customer's customer registration account, which in turn has an associated preferred payment account. Other customer biometric aspects may be used for identification, including a retinal scan, a voice print, a hand geometry scan, a facial characteristic, or another kind of biometric aspect.

In the embodiments described so far, the merchant's existing customer registration account numbers and customer identification devices could be used for implementing methods for allowing a customer to present his or her customer identification device as a payment device. For some merchants, this system may require reprogramming certain systems, for example terminal 102, to append the proprietary routing code to the customer registration account number before forwarding the resulting generated personal account number (PAN) for transaction processing.

In accordance with another example embodiment of the invention, this reprogramming may be avoided by selecting customer registration account numbers that already include a proprietary routing code and that are in a format similar to credit card or debit card account numbers.

FIGS. 10A and 10B show front and back views respectively of an example customer identification device 1001 in accordance with this example embodiment of the invention. Example customer identification device 1001 is a card having a customer registration account number 1002 printed or embossed on it. Customer registration account number 1002 is also encoded on magnetic strip 1003 on the back of card 1001. Customer registration account number 1003 is in the format of a typical credit card or debit card account number. In this example, account number 1003 has 19 digits, although other lengths may be used. Customer registration account number 1002 also begins with a proprietary routing code, in this example 1639635. This is an example of a code that is not and cannot be mistaken for a standard bank identification number (BIN) allocated by the American Bankers Association. For the purposes of this disclosure, a customer registration account number in this format may also be referred to as a personal account number (PAN).

During a transaction where card 1001 is presented as a payment device, customer registration account number 1002 is identified, for example by reading it from magnetic strip 1003 using a POS reader such as POS reader device 1003. The point of sale system then forwards the transaction information with the customer registration account number in the field where a payment account number is normally supplied. Because the customer registration account number is in the format of a credit card number and already contains the proprietary routing code, no appending or other reformatting is necessary. In fact, the POS equipment such as terminal 102 may not even recognize that the payment account number it is forwarding to an acquirer is non-standard.

From that point, the transaction proceeds in a manner similar to the transactions described in association with the first embodiment above. The acquirer recognizes that the transaction information contains a proprietary routing code and is a customer registration account number. The acquirer looks in a database similar to database 500 to look up the preferred payment account number associated with the customer registration account number, and constructs a new transaction approval request message with the preferred payment account number substituted for the customer registration account number. Payment of the transaction from the preferred payment account is then initiated in any of the usual ways. The preferred payment account can be a credit account, a demand deposit account, a stored value account, or another kind of account.

According to this example embodiment of the invention, a merchant who is setting up customer registration accounts for the first time may wish to choose customer registration accounts in a format similar to account number 1002. This choice enables standard, unmodified POS equipment to accept a customer's customer identification device as a payment device. A merchant with an existing customer registration program may wish to issue new customer registration account numbers in the format similar to account number 1002 in order to avoid additional programming of POS equipment.

A customer registration account number in a format similar to account number 1002 may be associated with a card such as card 1002, but may also be associated with any other kind of customer identification device, such as a fob, token, telephone number, or other kind of customer identification device.

Figure 11:
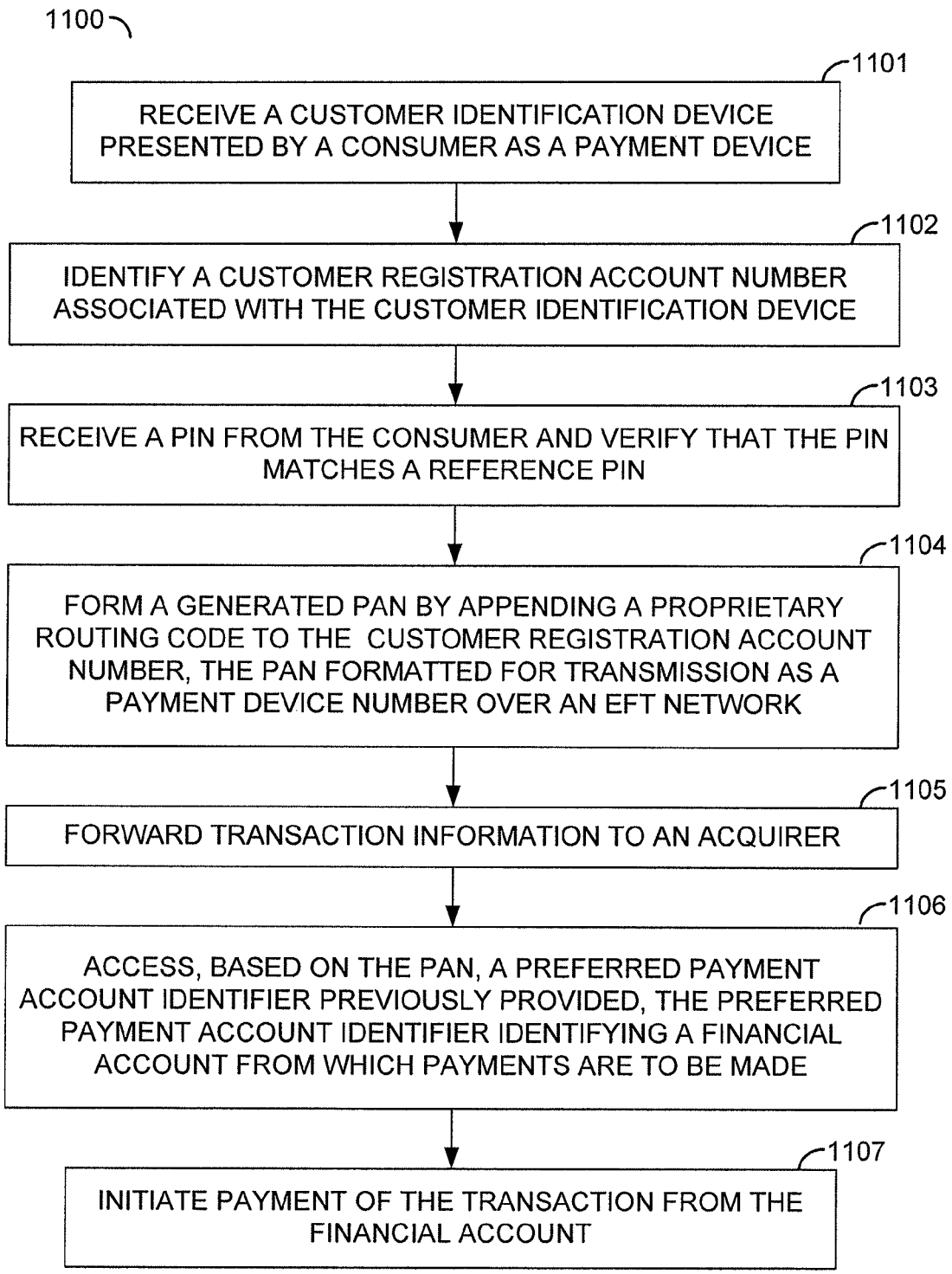
FIG. 11 shows a flowchart of a method in accordance with an example embodiment of the invention.

FIG. 11 shows a flowchart of a method 1100 in accordance with an example embodiment of the invention. In step 1101, a customer identification device is received from a consumer at a point of sale at the time of a purchase transaction. In step 1102, a customer registration account number of a customer registration account associated with the customer identification device is identified. In step 1103, a personal identification number (PIN) is received from the consumer, and it is verified that the PIN matches a reference PIN associated with the customer registration account. In step 1104, a generated personal account number (PAN) is formed by appending a proprietary routing code to the customer registration account number. The PAN is formatted for transmission as a payment device number over an electronic funds transfer network. In step 1105, information about the transaction, including the generated PAN and a transaction amount, is forwarded to an acquirer of payment transactions. In step 1106, a preferred payment account identifier, previously provided by the holder of the customer registration account, is accessed, based on the generated PAN, from a database stored on a computer readable medium. The preferred payment account identifier identifies a financial account from which payments are to be made when the customer identification device is used as the payment device. In step 1107, payment of the transaction from the financial account is initiated. In the method of FIG. 11, the proprietary routing code is not in the format of a standard bank identification number (BIN).

Figure 12:
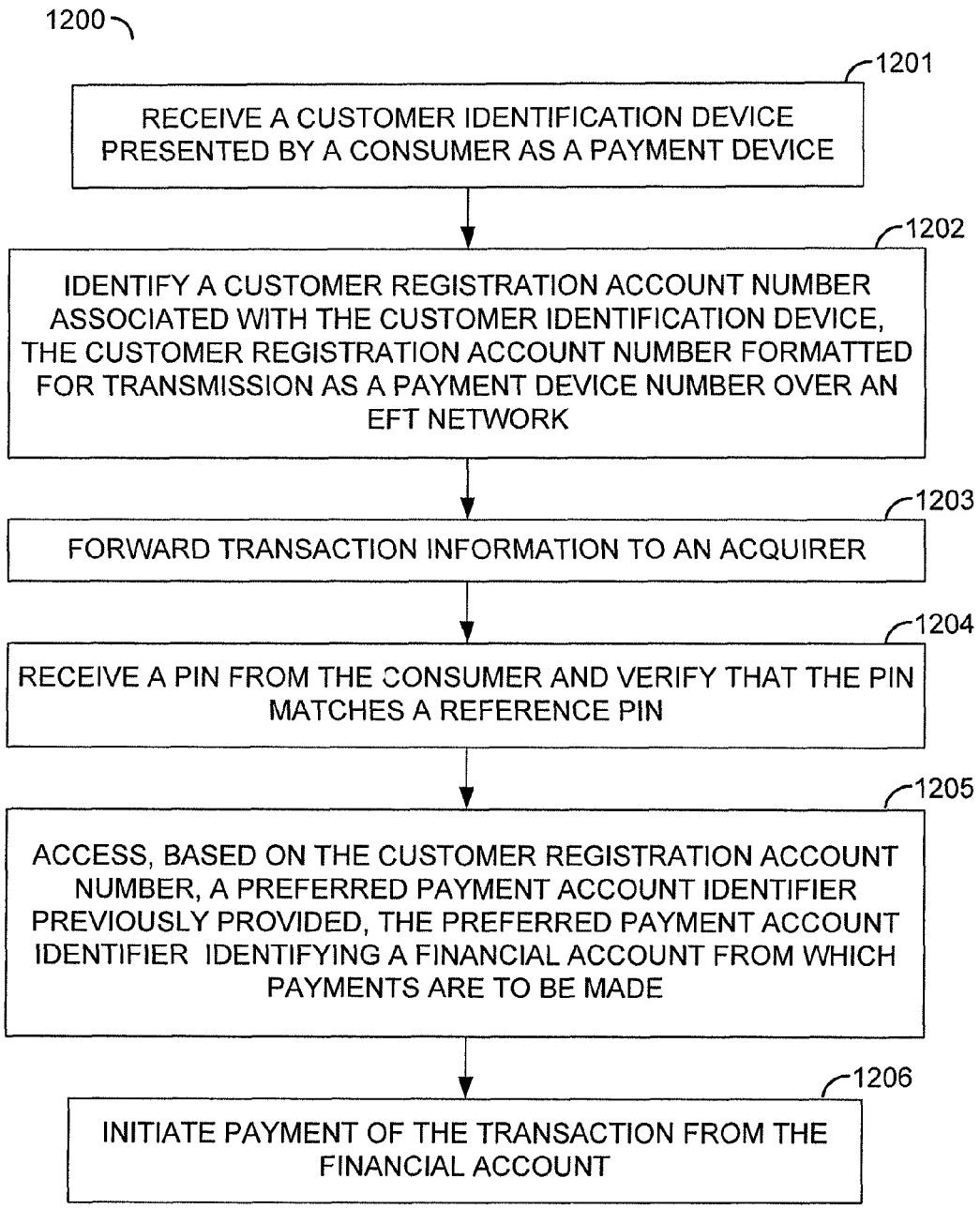
FIG. 12 shows a flowchart of a method in accordance with another example embodiment of the invention.

FIG. 12 shows a flowchart of a method 1200 in accordance with another example embodiment of the invention. In step 1201, a customer identification device is received from a consumer at a point of sale at the time of a purchase transaction. In step 1202, a customer registration account number of a customer registration account associated with the customer identification device is identified. The customer registration account number is formatted for transmission as a payment device number over an electronic funds transfer network, and the customer registration account number comprises as its initial digits a proprietary routing code. In step 1203, information about the transaction, including the customer registration account number and a transaction amount, is forwarded to an acquirer of payment transactions. In step 1204, a personal identification number (PIN) is received from the consumer, and it is verified that the PIN matches a reference PIN associated with the customer registration account identified by the customer registration account number. In step 1205, a preferred payment account identifier, previously designated by the holder of the customer registration account, is accessed, based on the customer registration account number, from a database stored on a computer readable medium. The preferred payment account identifies a financial account from which payments are to be made when the customer identification device is used as the payment device. In step 1206, payment of the transaction from the financial account is initiated.

Figure 13:
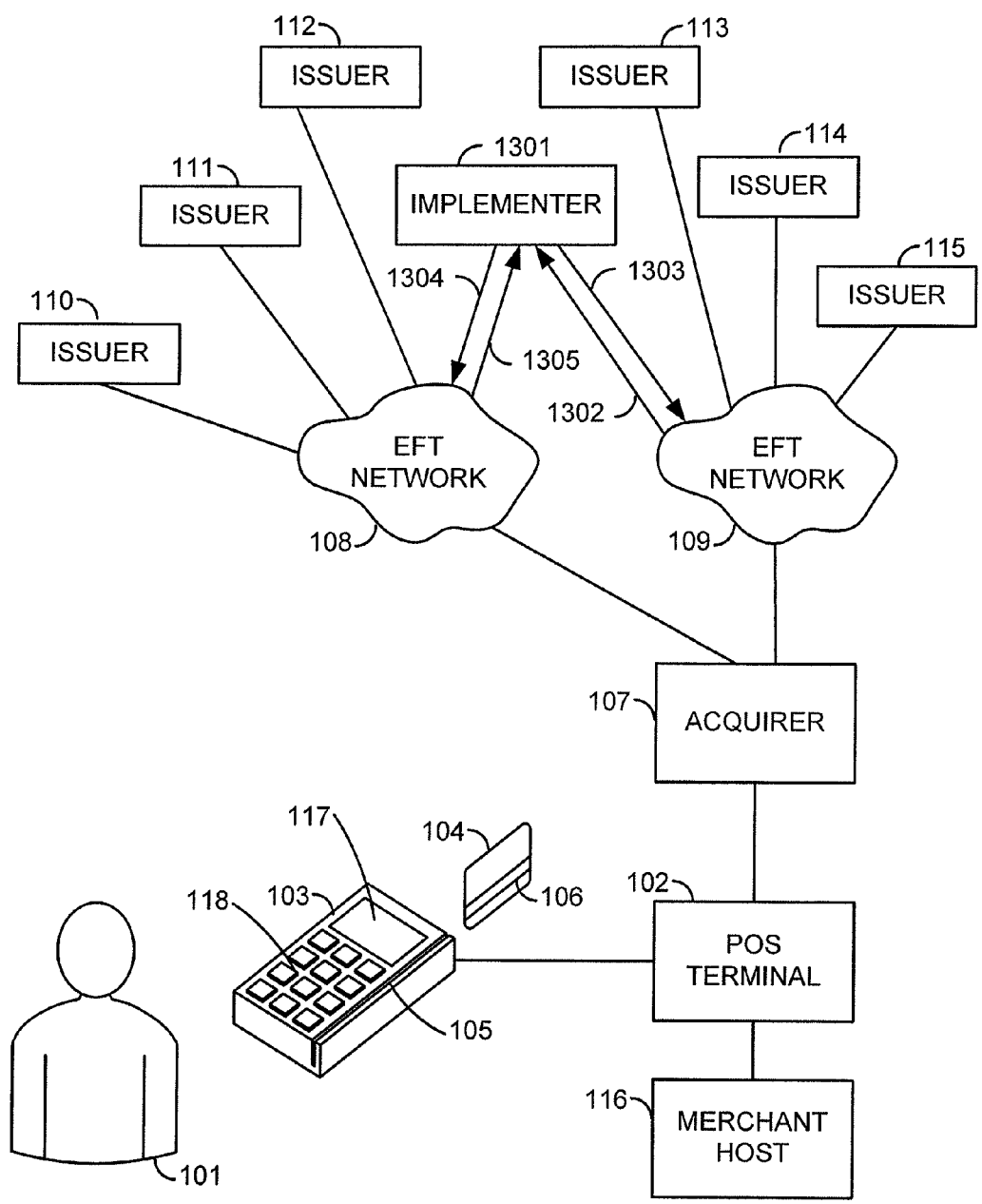
FIG. 13 shows a system in accordance with another embodiment.

FIG. 13 shows a system in accordance with another embodiment. In this embodiment an implementer 1301 is positioned to receive transaction information routed over one or more of networks 108, 109. Implementer 1301 may be, for example, an entity that provides a service for administering the processing of payment transaction made with a consumer's customer registration account identifier. Implementer 1301 may perform its function in part using a host computer executing a program stored on a computer readable medium. The arrangement shown in FIG. 13 has the advantage that no additional programming or development need by performed by acquirer 107. The POS system, comprising POS terminal 102, reads or generates a personal account number (PAN) as part of a transaction, and forwards transaction information, including the PAN, a transaction amount, and other information, to acquirer 107. Acquirer 107, based on its BIN table, routes the transaction to implementer 1301 via communication 1302. Based on the PAN, implementer 1301 accesses a database to determine a preferred payment account identifier identifying a financial account from which payments are to be made. Implementer 1301 then constructs a new set of transaction information, including the preferred payment account identifier, and routes the new set of transaction information to the issuer of the preferred payment account, for example via communication 1303 or 1304. The new set of transaction information may be sent to or through acquirer 107. The issuer of the account makes a determination of whether the transaction is approved, and the determination is routed back to the POS system, either directly or through implementer 1301.

The transaction information routed to implementer 1301 may include other information as well. For example, if a PIN is obtained at the POS, the PIN may be routed along with the transaction information and verified by implementer 1301.

Other embodiments are also possible, within the scope of the claims. For example, any of issuers 110-115 could also perform the functions of implementer 1301, providing a translation between a personal account number (PAN) and a preferred payment account number. Implementer 1301 may also be an issuer. The database correlating the numbers could reside at one of the issuers. Alternatively, one of networks 108, 109 could perform this function, and the database could reside with one of the networks.

In some embodiments, the ordering of method steps according to any embodiment of the invention may be altered. For example, verification that a PIN received at the time of the transaction matches a reference PIN may be performed by the merchant before the transaction information is forwarded to the acquirer, or may be performed by the acquirer after the transaction information is forwarded. Other variations are possible.

The invention has now been described in detail for the purposes of clarity and understanding. However, those skilled in the art will appreciate that certain changes and modifications may be practiced within the scope of the appended claims.

What is claimed is:

1. A method of processing an electronic payment, comprising:

storing a database that includes, for a particular merchant, a list of customer registration account numbers assigned to a set of registered customers and corresponding financial account numbers, wherein each customer registration account is part of a customer registration program specific to the particular merchant, and wherein the financial account numbers were previously registered by the respective registered customers and identify preferred payment accounts to be used to make payment when the registered customers make purchases from the particular merchant and present respective customer identification devices as payment devices;

receiving, at a point of sale system comprising a computer executing a program stored on a computer readable medium, at the particular merchant at the time of a purchase transaction, a customer identification device presented by a consumer to the particular merchant as a payment device, the customer identification device bearing one of the customer registration account numbers appearing in the database;

identifying the customer registration account number of the customer registration account associated with the customer identification device;

receiving a personal identification number (PIN) from the consumer and verifying that the PIN matches a reference PIN previously associated with the customer registration account;

forming, by the point of sale system, a generated personal account number (PAN) by appending a proprietary routing code to the customer registration account number, the PAN formatted for transmission as a payment device number over an electronic funds transfer network;

forwarding, by the point of sale system, information about the transaction, including the generated PAN and a transaction amount, to an acquirer of payment transactions;

accessing, based on the generated PAN, from the database, the preferred payment account identifier corresponding to the customer registration account number and previously provided by the holder of the customer registration account; and initiating payment of the transaction from the preferred payment financial account.

2. The method of claim 1, wherein the proprietary routing code comprises seven digits.

3. The method of claim 1, wherein the proprietary routing code comprises the numeral "1" as its first digit.

4. The method of claim 1, wherein the generated PAN is 19 digits long.

5. The method of claim 1, further comprising padding the generated PAN with zeros between the proprietary routing code and the customer registration account number.

6. The method of claim 1, wherein the preferred payment financial account is a credit card account, and wherein initiating payment of the transaction from the preferred payment financial account further comprises routing the transaction information to an issuer of the credit card account for transaction approval.

7. The method of claim 1, wherein the preferred payment financial account is a demand deposit account, and wherein initiating payment of the transaction from the preferred payment financial account further comprises creating and transmitting an automated clearing house file that instructs that the demand deposit account be debited the transaction amount.

8. The method of claim 1, wherein the preferred payment financial account is a stored value account, and wherein initiating payment of the transaction from the preferred payment financial account further comprises routing the transaction information to an issuer of the stored value account for transaction approval.

9. The method of claim 1, further comprising enrolling the consumer in the customer registration program, and wherein enrolling the consumer in the customer registration program further comprises:
- receiving, from the consumer, identifying information about the consumer;
- receiving, from the consumer, the preferred payment account identifier;
- providing, to the consumer, the customer registration account number; and
- associating, in the database, the preferred payment account identifier with the customer registration account number.

10. The method of claim 1, wherein the customer identification device is a customer registration card.

11. The method of claim 1, wherein the customer identification device is a biometric aspect of the consumer.

12. The method of claim 1, wherein the customer identification device is a telephone number.

13. The method of claim 1, wherein the customer identification device is a card having the customer registration account number encoded on a magnetic strip.

14. The method of claim 1, wherein the customer identification device provides the customer registration account number via a radio frequency signal.

15. The method of claim 1, wherein the financial account is a first financial account and the preferred payment account identifier is a first preferred payment account identifier, and further comprising, at a time after enrollment is completed:
- receiving, from a customer, an indication that a second financial account is to be the preferred payment financial account;
- receiving, from the customer, a second preferred payment account identifier identifying a second financial account; and
- recording, in the database, the second preferred payment account identifier.

16. The method of claim 1, wherein the proprietary routing code is not in the format of a standard bank identification number.

17. A method of processing an electronic payment, comprising:
- storing a database that includes, for a particular merchant, a list of customer registration account numbers assigned to a set of registered customers and corresponding financial account numbers, wherein each customer registration account is part of a customer registration program specific to the particular merchant, and wherein the financial account numbers were previously registered by the respective registered customers and identify preferred payment accounts to be used to make payment when the registered customers makes purchases from the particular merchant and present respective customer identification devices as payment devices:
- receiving, at a point of sale system comprising a computer executing a program stored on a computer readable medium, at the particular merchant at the time of a purchase transaction, a customer identification device presented by a consumer to the particular merchant as a payment device;
- identifying the customer registration account number of the customer registration account associated with the customer identification device, wherein the customer registration account number is not a financial account number and the customer registration account number is formatted for transmission as a payment device number over an electronic funds transfer network, and the customer registration account number comprising as its initial digits a proprietary routing code that is not in the format of a standard bank identification number;
- forwarding, by the point of sale system, information about the transaction, including the customer registration account number and a transaction amount, to an acquirer of payment transactions;
- receiving a personal identification number (PIN) from the consumer and verifying that the PIN matches a reference PIN previously associated with the customer registration account identified by the customer registration account number;
- accessing, based on the customer registration account number, from the database, the preferred payment account identifier corresponding to the customer registration account number and previously provided by the holder of the customer registration account, the preferred payment account identifier identifying the preferred payment financial account from which payments are to be made when the customer identification device is used as the payment device; and
- initiating payment of the transaction from the preferred payment financial account.

18. The method of claim 17, wherein the proprietary routing code comprises seven digits.

19. The method of claim 17, wherein the proprietary routing code comprises the numeral "1" as its first digit.

20. The method of claim 17, wherein the customer registration account number is 19 digits long.

21. The method of claim 17, wherein the preferred payment financial account is a credit card account, and wherein initiating payment of the transaction from the preferred payment financial account further comprises routing the transaction information to an issuer of the credit card account for transaction approval.

22. The method of claim 17, wherein the preferred payment financial account is a demand deposit account, and wherein initiating payment of the transaction from the preferred payment financial account further comprises creating and transmitting an automated clearing house file that instructs that the demand deposit account be debited the transaction amount.

23. The method of claim 17, wherein the preferred payment financial account is a prepaid card account, and wherein initiating payment of the transaction from the preferred payment financial account further comprises routing the transaction information to an issuer of the prepaid card account for transaction approval.

24. The method of claim 17, further comprising enrolling the consumer in a customer registration program, and wherein enrolling the consumer in the customer registration program further comprises:
- receiving, from the consumer, identifying information about the consumer;
- receiving, from the consumer, the preferred payment account identifier;
- providing, to the consumer, the customer registration account number; and
- associating the preferred payment account identifier with the customer registration account number.

25. The method of claim 17, wherein the customer identification device is a card having the customer registration account number encoded on a magnetic strip.

26. The method of claim 17, wherein the customer identification device provides the customer registration account number via a radio frequency signal.

27. The method of claim 17, wherein the financial account is a first financial account and the preferred payment account identifier is a first preferred payment account identifier, and further comprising, at a time after enrollment is completed:
   receiving, from the consumer, an indication that a second financial account is to be the preferred payment financial account;
   receiving, from the consumer, a second preferred payment account identifier identifying the second financial account; and
   recording, in the database, the second preferred payment account identifier.

28. A point of sale system comprising a computer executing a program stored on a computer readable medium, the point of sale system configured to:
   receive, at a point of sale at the time of a purchase transaction at a particular merchant, a customer identification device presented by a consumer to the particular merchant as a payment device;
   identify a customer registration account number of a customer registration account associated with the customer identification device;
   access a database that includes, for the particular merchant, a list of customer registration account numbers assigned to a set of registered customers, wherein each customer registration account is part of a customer registration program specific to the particular merchant, and wherein the database further includes an indication that the consumer previously registered at least one financial account as a preferred payment account to be used to make payment when the consumer makes a purchase from the particular merchant and presents the customer identification device as a payment device;
   form, by the point of sale system, a generated personal account number (PAN) by appending a proprietary routing code to the customer registration account number, the PAN formatted for transmission as a payment device number over an electronic funds transfer network;
   forward, by the point of sale system, information about the transaction, including the generated PAN and a transaction amount, to an acquirer of payment transactions.

29. The point of sale system of claim 28, wherein the proprietary routing code is not in the format of a standard bank identification number.

30. A method of processing a transaction, comprising:
   storing a database that includes, for a particular merchant, a list of customer registration account numbers assigned to a set of registered customers and corresponding financial account numbers, wherein each customer registration account is part of a customer registration program specific to the particular merchant, and wherein the financial account numbers were previously registered by the respective registered customers and identify preferred payment accounts to be used to make payment when the registered customers make purchases from the particular merchant and present respective customer identification devices as payment devices;
   receiving, by a host computer executing a program stored on a computer readable medium, from a point of sale system at the particular merchant, transaction information comprising a personal account number, wherein the personal account number is not a financial account number and wherein the personal account number is formatted for transmission as a payment device number over an electronic funds transfer network, wherein the personal account number identifies a particular customer registration account that is part of the customer registration program specific to the particular merchant, and wherein the personal account number is a generated personal account number formed by the point of sale system by appending a proprietary routing code that is not a standard bank identification number to a customer registration account number;
   recognizing that the personal account number comprises the proprietary routing code;
   accessing, based on the personal account number, from the database, a preferred payment account identifier, the preferred payment account identifier identifying the preferred payment financial account from which payments are to be made; and
   initiating payment of the transaction from the preferred payment financial account.

31. The method of claim 30, further comprising:
   receiving, at the host computer system, a personal identification number (PIN) transmitted by the merchant; and
   verifying that the PIN matches a reference PIN previously associated with the personal account number.

32. The method of claim 30, further comprising:
   receiving, from an issuer of the preferred payment financial account, an indication of whether the transaction is approved; and
   forwarding the indication to the merchant.

33. A method of processing a transaction, the method comprising:
   storing a database that includes, for a particular merchant, a list of customer registration account numbers assigned to a set of registered customers, wherein each customer registration account is part of a customer registration program specific to the particular merchant, and wherein the database further includes an indication that at least one particular consumer previously registered at least one financial account as a preferred payment account to be used to make payment when the consumer makes a purchase from the particular merchant and presents a customer identification device as a payment device;
   receiving, at a point of sale system executing a program stored on a computer readable medium, at the particular merchant, a customer identification device presented by a consumer to the particular merchant as a payment device;
   identifying, from the database, a customer registration account number of a customer registration account associated with the customer identification device,
   forming, by the point of sale system, a generated personal account number (PAN) by appending a proprietary routing code to the customer registration account number, the PAN formatted for transmission as a payment device number over an electronic funds transfer network;
   forwarding by point of sales system, information about the transaction, including the generated PAN and a transaction amount, to an acquirer of payment transactions.

34. The method of claim 33, wherein the proprietary routing code comprises seven digits.

35. The method of claim 33, wherein the proprietary routing code comprises the numeral "1" as its first digit.

36. The method of claim 33, wherein the generated PAN is 19 digits long.

37. The method of claim 33, further comprising padding the generated PAN with zeros between the proprietary routing code and the customer registration account number.

38. A system for processing transactions, the system comprising:
   a host computer executing a program stored on a computer-readable medium; and
   an interface for receiving transaction information over a network;

wherein, under control of the stored program, the host computer stores a database that includes, for a particular merchant, a list of customer registration account numbers assigned to a set of registered customers and corresponding financial account numbers, wherein each customer registration account is part of a customer registration program specific to the particular merchant, and wherein the financial account numbers were previously registered by the respective registered customers and identify preferred payment accounts to be used to make payment when the registered customers make purchases from the particular merchant and present respective customer identification devices as payment devices;

receives, from a point of sale system at the particular merchant via the network, transaction information comprising a personal account number, the personal account number generated by the point of sale system by appending a proprietary routing code that is not a standard bank identification number to a customer registration number, and the personal account number formatted for transmission as a payment device number over an electronic funds transfer network;

recognizes that the personal account number comprises the proprietary routing code;

accesses, based on the personal account number, from the database, a preferred payment account identifier, the preferred payment account identifier identifying the preferred payment financial account from which payments are to be made when the consumer presents the customer identification device as a payment device; and initiates payment of the transaction from the preferred payment financial account.

39. The system of claim 38, wherein the host computer further:

receives a personal identification number (PIN) transmitted by the merchant; and verifies that the PIN matches a reference PIN previously associated with the personal account number.

40. The system of claim 38, wherein the host computer further:

receives, from an issuer of the preferred payment financial account, an indication of whether the transaction is approved; and forwards the indication to the merchant.

* * * * *